United States Patent
Funk et al.

(10) Patent No.: US 8,461,278 B2
(45) Date of Patent: Jun. 11, 2013

(54) PROCESS FOR PRODUCING WATER-ABSORBING POLYMER PARTICLES

(75) Inventors: Rüdiger Funk, Niedernhausen (DE); Thomas Pfeiffer, Boehl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 264 days.

(21) Appl. No.: 13/071,041

(22) Filed: Mar. 24, 2011

(65) Prior Publication Data

US 2011/0237735 A1    Sep. 29, 2011

Related U.S. Application Data

(60) Provisional application No. 61/317,291, filed on Mar. 25, 2010.

(30) Foreign Application Priority Data

Mar. 25, 2010  (EP) ..................... 10157686

(51) Int. Cl.
*C08F 120/06* (2006.01)
*C08G 85/00* (2006.01)
*B01J 19/00* (2006.01)
*B65G 37/00* (2006.01)
*F26B 9/00* (2006.01)

(52) U.S. Cl.
USPC .......... 526/317.1; 526/72; 526/918; 526/923; 422/131; 198/347.1; 34/659

(58) Field of Classification Search
CPC .......... C08F 120/06; C08G 85/00; B01J 19/00; B65G 37/00; F26B 9/00
USPC ................ 526/317.1, 72, 918, 923; 422/131; 198/347.1; 34/659
See application file for complete search history.

(56) References Cited

U.S. PATENT DOCUMENTS

| 5,981,070 | A | 11/1999 | Ishizaki et al. |
| 6,562,879 | B1 * | 5/2003 | Hatsuda et al. ............... 521/56 |
| 7,378,453 | B2 | 5/2008 | Nogi et al. |
| 7,541,395 | B2 | 6/2009 | Reimann et al. |
| 7,833,624 | B2 | 11/2010 | Harren et al. |

FOREIGN PATENT DOCUMENTS

| EP | 0 780 424 A1 | 6/1997 |
| EP | 1462473 A1 | 9/2004 |
| WO | WO-98/49221 A1 | 11/1998 |
| WO | WO-2004/037900 A1 | 5/2004 |
| WO | WO 2008113788 A2 * | 9/2008 |

OTHER PUBLICATIONS

Buchholz et al., Modern Superabsorbent Polymer Technology, Wiley-VCH, pp. 71-103 (1998).

* cited by examiner

*Primary Examiner* — Michael M Bernshteyn
(74) *Attorney, Agent, or Firm* — Marshall, Gerstein & Borun LLP

(57) ABSTRACT

A process for producing water-absorbing polymer particles, wherein heated water-absorbing polymer particles are remoisturized and cooled in a high-speed mixer.

10 Claims, No Drawings

PROCESS FOR PRODUCING WATER-ABSORBING POLYMER PARTICLES

CROSS-REFERENCE TO RELATED APPLICATIONS

This application claims the benefit of U.S. provisional patent application No. 61/317,291, filed Mar. 25, 2010, incorporated herein by reference in its entirety.

The present invention relates to a process for producing water-absorbing polymer particles, wherein heated water-absorbing polymer particles are remoisturized and cooled in a high-speed mixer.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With increasing amount of crosslinker, the centrifuge retention capacity (CRC) falls and the absorption under a pressure of 21.0 $g/cm^2$ (AUL0.3 psi) passes through a maximum.

To improve the performance properties, for example, permeability of the swollen gel bed (SFC) in the diaper and absorption under a pressure of 49.2 $g/cm^2$ (AUL0.7 psi), water-absorbing polymer particles are generally surface postcrosslinked. This increases the crosslinking of the particle surface, which can at least partly decouple the absorption under a pressure of 49.2 $g/cm^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

After the thermal surface postcrosslinking, the water-absorbing polymer particles often have a moisture content of less than 1% by weight. This increases the tendency of the polymer particles to static charging. The static charging of the polymer particles influences the metering accuracy, for example in diaper production. This problem is typically solved by setting a defined moisture content by adding water or aqueous solutions (remoisturizing).

Processes for remoisturizing are disclosed, for example, in EP 0 780 424 A1, WO 98/49221 A 1, WO 2004/037900 A1 and EP 1 462 473 A 1.

It was an object of the present invention to provide an improved process for remoisturizing water-absorbing polymer particles, especially with a reduced tendency to agglomerate.

The object is achieved by a process for producing water-absorbing polymer particles by polymerizing a monomer solution or suspension comprising a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers mentioned under a) and
e) optionally one or more water-soluble polymers, comprising drying, grinding, classifying, thermal surface postcrosslinking and remoisturizing, which comprises performing the remoisturizing step in a continuous horizontal mixer with moving mixing tools, where the Froude number is at least 0.05, the water-absorbing polymer particles in the horizontal mixer have a starting temperature of at least 90° C., and the remoisturized water-absorbing polymer particles in the horizontal mixer are cooled to a temperature of less than 80° C.

The method of cooling is not subject to any restriction. For example, the horizontal mixer may have a water-cooled jacket. It is also possible to pass a cold gas though, for example air or nitrogen, or to cool by means of the water used for remoisturizing. Combinations of two or more measures are preferred.

Mixers with rotating mixing tools are divided into vertical mixers and horizontal mixers according to the position of the axis of rotation.

Horizontal mixers in the context of this invention are mixers with rotating mixing tools, the position of the axis of rotation of which with respect to the product flow direction deviates from the horizontal by less than 20°, preferably by less than 15°, more preferably by less than 10° and most preferably by less than 5°.

In the process according to the invention, it is possible to use all horizontal mixers which have moving mixing, tools and are known to those skilled in the art, such as screw mixers, disk mixers, plowshare mixers, paddle mixers, helical ribbon mixers and continuous flow mixers. A preferred horizontal mixer is the disk mixer.

The inner wall of the mixer has, with respect to water, a contact angle of preferably less than 70°, more preferably of less than 60° and most preferably of less than 50°. The contact angle is a measure of the wetting behavior and is measured to DIN 53900.

It is advantageous in the process according to the invention to use mixers whose inner wall which is in contact with the product is made of a stainless steel. Stainless steels typically have a chromium content of 10.5 to 13% by weight. The high chromium content leads to a protective passivation layer of chromium dioxide on the steel surface. Further alloy constituents increase the corrosion resistance and improve the mechanical properties.

Particularly suitable steels are austenitic steels with, for example, at least 0.08% by weight of carbon. The austenitic steels advantageously comprise further alloy constituents, preferably niobium or titanium, in addition to iron, carbon, chromium, nickel and optionally molybdenum.

The preferred stainless steels are steels with materials number 1.43xx or 1.45xx according to DIN EN 10020, where xx may be a natural number from 0 to 99. Particularly preferred materials are the steels with materials numbers 1.4301, 1.4541 and 1.4571, especially steel with materials number 1.4301.

Advantageously, the inner wall of the mixer which is in contact with the product is polished. Polished stainless steel surfaces have a lower roughness and a lower contact angle with respect to water than matt or roughened steel surfaces.

The Froude number is defined as follows:

$$Fr = \frac{\omega^2 r}{g}$$

r: radius of the mixing tool
ω: angular frequency
g: acceleration due to gravity The Froude number is at least 0.05, preferably from 0.1 to 6, more preferably from 0.12 to 3 and most preferably from 0.15 to 1.

The temperature of the water-absorbing polymer particles supplied to the horizontal mixer (starting temperature) is at least 90° C., preferably at least 95° C., more preferably at least 100° C. and most preferably at least 105° C. At excessively high temperatures, the amount of water which evaporates is already appreciable, and so the amount of water used has to be increased correspondingly.

The water-absorbing polymer particles are cooled in the horizontal mixer to a temperature of preferably less than 75° C., more preferably less than 70° C. and most preferably less than 65° C.

The remoisturizing step increases the moisture content preferably by 1 to 10% by weight, more preferably by 2 to 8% by weight and most preferably by 3 to 5% by weight. The remoisturizing step increases the mechanical stability of the polymer particles and reduces their tendency to static charging.

The peripheral speed of the mixing tools is preferably from 0.1 to 10 m/s, more preferably from 0.5 to 5 m/s and most preferably from 0.75 to 2.5 m/s.

The fill level of the horizontal mixer is preferably from 30 to 80%, more preferably from 40 to 75% and most preferably from 50 to 70%.

The residence time in the horizontal mixer is preferably from 1 to 180 minutes, more preferably from 2 to 60 minutes and most preferably from 5 to 20 minutes.

The aqueous liquids usable for remoisturization, for example water itself, are not subject to any restriction.

The aqueous liquid is preferably sprayed on by means of a two-substance nozzle, more preferably by means of an internally mixing two-substance nozzle.

Two-substance nozzles enable atomization into fine droplets or a spray mist. The atomization form employed is a circular or else elliptical solid or hollow cone. Two-substance nozzles may be configured with external mixing or internal mixing. In the case of the externally mixing two-substance nozzles, liquid and atomizer as leave the nozzle head through separate orifices. They are mixed in the spray jet only after leaving the spray nozzle. This enables independent regulation of droplet size distribution and throughput over a wide range. The spray cone of the spray nozzle can be adjusted via the air cap setting. In the case of the internally mixing two-substance nozzle, liquid and atomizer gas are mixed within the spray nozzle and the biphasic mixture leaves the nozzle head through the same bore (or through a plurality of parallel bores). In the case of the internally mixing two-substance nozzle, the quantitative ratios and pressure conditions are more highly coupled than in the case of the externally mixing spray nozzle. Small changes in the throughput therefore lead to a change in the droplet size distribution. The adjustment to the desired throughput is effected through the selected cross section of the nozzle bore.

Useful atomizer gases include compressed air, nitrogen or steam of 0.5 bar or more. The droplet size can be adjusted individually via the ratio of liquid to atomizer gas, and also gas and liquid pressure.

The present invention is based on the finding that the agglomeration tendency of water-absorbing polymer particles in the remoisturizing step is influenced both by the stirrer speed and by the cooling of the water-absorbing polymer particles. Of particular importance, however, is a sufficiently high temperature of the water-absorbing polymer particles immediately before the remoisturizing step. The faster diffusion into the particle interior possibly outweighs the already appreciable evaporation.

The production of the water-absorbing polymer particles is described in detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol % and most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight and especially around 50 ppm by weight of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/38402 A1. Polymerization on a belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the permeability (SFC). The proportion of excessively small polymer particles ("fines") should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

To further improve the properties, the polymer particles are surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in tell is of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Drier (Hosokawa Micron GmbH; Leingarten; Germany), Hosokawa Bepex® Disc Drier (Hosokawa Micron GmbH; Leingarten; Germany) and Nara Paddle Drier (NARA Machinery Europe; Frechen; Germany). Moreover, fluidized bed driers may also be used.

The drying can be effected in the mixer itself, by heating the jacket or blowing in warm air. Equally suitable is a downstream drier, for example a shelf drier, a rotary tube oven or a heatable screw. It is particularly advantageous to mix and dry in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles may be coated.

Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 0.2 to 10% by weight and most preferably 0.5 to 8% by weight, the moisture content being determined by EDANA recommended test method No. WSP 230.2-05 "Moisture Content".

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA (European Disposables and Nonwovens Association) recommended test method No. WSP 241.2-05 "Centrifuge Retention Capacity".

The water-absorbing polymer particles produced by the process according to the invention have an absorption under a pressure of 49.2 g/cm$^2$ of typically at least 15 g/g, preferably at least 20 g/g, more preferably at least 22 g/g, especially preferably at least 24 g/g and most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to EDANA recommended test method No. WSP 242.2-05 "Absorption under Pressure", except with a pressure of 49.2 g/cm$^2$ instead of a pressure of 21.0 g/cm$^2$.

METHODS

The measurements should, unless stated otherwise, be carried out at an ambient temperature of 23±2° C. and a relative air humidity of 50±10%. The water-absorbing polymer particles are mixed thoroughly before the measurement.

Saline Flow Conductivity

The saline flow conductivity (SFC) of a swollen gel layer under a pressure of 0.3 psi (2070 Pa) is, as described in EP 0 640 330 A 1, determined as the gel layer permeability of a swollen gel layer of water-absorbing polymer particles, the apparatus described on page 19 and in FIG. 8 in the aforementioned patent application having been modified such that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1. The flow is detected automatically.

The saline flow conductivity (SFC) is calculated as follows:

$$SFC[cm^3 s/g] = (Fg(t=0) \times L0)/(d \times A \times WP)$$

where $Fg(t=0)$ is the flow of NaCl solution in g/s, which is obtained using linear regression analysis of the $Fg(t)$ data of the flow determinations by extrapolation to t=0. L0 is the thickness of the gel layer in cm, d is the density of the NaCl solution in g/cm$^3$, A is the area of the gel layer in cm$^2$, and WP is the hydrostatic pressure over the gel layer in dyn/cm$^2$.

Centrifuge Retention Capacity

The centrifuge retention capacity (CRC) of the water-absorbing polymer particles is determined by EDANA recommended test method No. WSP 241.2-05 "Centrifuge Retention Capacity".

Absorption Under a Pressure of 21.0 g/cm$^2$

The absorption under a pressure of 21.0 g/cm$^2$ (AUL0.3 psi) of the water-absorbing polymer particles is determined by EDANA recommended test method No. WSP 242.2-05 "Absorption under Pressure".

Absorption Under a Pressure of 63.0 g/cm²

The absorption under a pressure of 63.0 g/cm² (AUL0.9 psi) of the water-absorbing polymer particles is determined analogously to EDANA recommended test method No. WSP 242.2-05 "Absorption under Pressure", except that a pressure of 63.0 g/cm² (AUL0.9 psi) is established instead of a pressure of 21.0 g/cm² (AUL0.3 psi).

Extractables

The proportion of extractables of the water-absorbing polymer particles is determined according to EDANA recommended test method No. WSP 270.2-05 "Extractables".

The EDANA test methods are obtainable, for example, from EDANA, Avenue Eugene Plasky 157, B-1030 Brussels, Belgium.

EXAMPLES

Production of the Water-Absorbing Polymer Particles

By continuously mixing deionized water, 50% by weight sodium hydroxide solution and acrylic acid, an acrylic acid/sodium acrylate solution was prepared such that the degree of neutralization corresponded to 65 mol %. The solids content of the monomer solution was 40% by weight.

The polyethylenically unsaturated crosslinker used was polyethylene glycol-400 diacrylate (diacrylate proceeding from a polyethylene glycol with a mean molar mass of 400 g/mol). The amount used was 1.35 g per kg of monomer solution.

To initiate the free-radical polymerization, per kg of monomer solution, 5.11 g of a 0.33% by weight aqueous hydrogen peroxide solution, 6.31 g of a 15% by weight aqueous sodium peroxodisulfate solution and 4.05 g of a 0.5% by weight ascorbic acid solution were used.

The throughput of the monomer solution was 1200 kg/h. The reaction solution had a feed temperature of 23.5° C.

The individual components were metered in the following amounts continuously into a List ORP 250 Contikneter continuous kneader reactor (LIST AG, Arisdorf, Switzerland):

1200 kg/h of monomer solution
1.620 kg/h of polyethylene glycol-400 diacrylate
13.704 kg/h of hydrogen peroxide solution/sodium peroxodisulfate solution
4.860 kg/h of ascorbic acid solution Between the addition point for crosslinker and the addition sites for the initiators, the monomer solution was inertized with nitrogen.

After approx. 50% of the residence time there was an additional metered addition to the reactor of fines (45 kg/h) which were obtained from the production process by grinding and sieving. The residence time of the reaction mixture in the reactor was 15 minutes.

The resulting polymer gel was applied to a belt drier. On the belt drier, an air/gas mixture flowed continuously around the polymer gel and dried it at 175° C. The residence time in the belt drier was 43 minutes.

The dried polymer gel was ground and screened off to a particle size fraction of 150 to 850 μm. The base polymer thus obtained had the following properties:

CRC: 32 g/g
AUL0.3 psi: 26 g/g
Extractables: 9.8% by weight

In a Schugi Flexomix® FX 160 (Hosokawa-Micron B.V., Doetinchem, the Netherlands), the base polymer was coated with the surface postcrosslinking solution and then dried directly in a NARA NPD 5W8 Paddle-Drier (GMF Gouda, Waddinxveen, the Netherlands) at 190° C. for 45 minutes.

The following amounts were metered into the Schugi Flexomix®:

500 kg/h of base polymer
25.0 kg/h of surface postcrosslinking solution

The surface postcrosslinking solution comprised 2.0% by weight of N-hydroxyethyl-2-oxazolidinone, 97.5% by weight of deionized water and 0.5% by weight of sorbitan monococoate.

The surface postcrosslinked water-absorbing polymer particles were subsequently cooled to approx. 60° C. in a NARA NPD 3W9 Paddle-Cooler (GMF Gouda, Waddinxveen, NL) and then screened off once again to 150 to 850 μm.

The surface postcrosslinked water-absorbing polymer particles used had the following profile of properties:

CRC: 26.5 g/g
AUL0.9 psi: 21 g/g
SFC: $120 \times 10^{-7}$ cm³s/g
Extractables: 7.8% by weight Examples 1 to 7

In a heatable metal vessel with a diameter and a total height (incl. lid) of 15 cm each and an integrated anchor stirrer with a diameter of 13.5 cm, in each case 300 g of water-absorbing polymer particles were heated at a stirrer speed of 30 revolutions per minute (rpm) to the product temperature specified in table 1 below. Subsequently, within approx. 0.5 minute, by means of an atomizer, in each case 5.4%±0.1% of water was sprayed on, with the stirrer speed set to 100 rpm. After the addition of water had ended, the stirrer speed was set to 20 or 100 rpm according to table 1 (corresponding to a Froude number of 0.03 and 0.75 respectively) and stirred at the stirrer speed specified for 30 minutes in each case, while either maintaining the temperature set (corresponding to the product temperature, i.e. "without cooling") or lowering the temperature by means of external air cooling ("with cooling"). After this stirring phase, the contents of the metal vessel were in each case transferred to a 1 liter glass vessel, with the reported product temperature of the remoisturized water-absorbing polymer particles on removal, and were stored in the glass vessel in the closed state for 24 hours.

To determine the agglomerate content, the contents of the glass vessel were classified on a screening machine (amplitude of 0.5 mm) for 5 minutes in each case. The results are summarized in table 2:

TABLE 1

| | Settings | | | | | |
|---|---|---|---|---|---|---|
| Ex. | Product temperature [° C.] | Water added [g] | Water added [%] | Stirrer speed [rpm] | With or without air cooling | Temperature on removal [° C.] |
| 1*) | 95 | 16.0 | 5.3 | 20 | without | 95 |
| 2*) | 95 | 15.8 | 5.3 | 20 | air cooling | 45 |
| 3*) | 95 | 16.3 | 5.4 | 100 | without | 95 |
| 4 | 95 | 16.2 | 5.4 | 100 | air cooling | 43 |
| 5*) | 65 | 16.2 | 5.4 | 20 | air cooling | 37 |
| 6*) | 65 | 16.2 | 5.4 | 100 | without | 65 |
| 7*) | 65 | 16.5 | 5.5 | 100 | air cooling | 37 |

*)Comparative examples

TAB. 2

| | | | Results | | | | |
|---|---|---|---|---|---|---|---|
| Ex. | >1.6 mm [g] | 1-1.6 mm [g] | <1.0 mm [g] | >1.6 mm [%] | 1-1.6 mm [%] | <1.0 mm [%] | >1.0 mm [%] |
| 1*) | 42.85 | 43.21 | 210.34 | 14.5 | 14.6 | 71.0 | 29.0 |
| 2*) | 31.78 | 33.30 | 236.17 | 10.5 | 11.1 | 78.4 | 21.6 |
| 3*) | 26.66 | 38.40 | 228.26 | 9.1 | 13.1 | 77.8 | 22.2 |
| 4 | 25.07 | 36.53 | 235.90 | 8.4 | 12.3 | 79.3 | 20.7 |
| 5*) | 62.61 | 87.10 | 154.01 | 20.6 | 28.7 | 50.7 | 49.3 |
| 6*) | 65.44 | 62.18 | 174.94 | 21.6 | 20.6 | 57.8 | 42.2 |
| 7*) | 86.72 | 76.85 | 144.05 | 28.2 | 25.0 | 46.8 | 53.2 |

*)Comparative examples

Comparison of examples 1 and 3 shows that a lower level of agglomerates forms at high temperature (95° C.) and high stirrer speed (100 rpm) after storage for 24 hours than at high temperature (95° C.) and low stirrer speed (20 rpm).

Comparison of examples 3 and 6 shows that a lower level of agglomerates forms at high stirrer speed (100 rpm) and high temperature (95° C.) after storage for 24 hours than at high stirrer speed (100 rpm) and low temperature (65° C.).

The invention claimed is:

1. A process for producing water-absorbing polymer particles by polymerizing a monomer solution or suspension comprising
   a) at least one ethylenically unsaturated monomer which bears an acid group and optionally at least partly neutralized,
   b) at least one crosslinker,
   c) at least one initiator,
   d) optionally one or more ethylenically unsaturated monomer copolymerizable with the monomer mentioned under a), and
   e) optionally one or more water-soluble polymer,
   comprising drying, grinding, classifying, thermal surface postcrosslinking, and remoisturizing, which comprises performing the remoisturizing step in a continuous horizontal mixer with moving mixing tools, where the Froude number is at least 0.05, the water-absorbing polymer particles in the horizontal mixer have a starting temperature of at least 90° C., and the remoisturized water-absorbing polymer particles in the horizontal mixer are cooled to a temperature of less than 80° C.

2. The process according to claim 1, wherein a moisture content of the water-absorbing polymer particles is increased in the remoisturizing step by at least 1% by weight.

3. The process according to claim 1, wherein the water-absorbing polymer particles in the remoisturizing step in the horizontal mixer have a starting temperature of at least 95° C.

4. The process according to claim 1, wherein the water-absorbing polymer particles in the remoisturizing step are moved at a speed which corresponds to a Froude number of at least 0.15.

5. The process according to claim 1, wherein the water-absorbing polymer particles in the remoisturizing step in the horizontal mixer are cooled to a temperature of less than 70° C.

6. The process according to any of claims claim 1, wherein a moisture content of the water-absorbing polymer particles is increased in the remoisturizing step by at least 2% by weight.

7. The process according to claim 1, wherein a residence time in the remoisturizing step in the horizontal mixer is from 1 to 180 minutes.

8. The process according to claim 1, wherein the monomer a) is acrylic acid partly neutralized to an extent of at least 50 mol %.

9. The process according to claim 1, wherein the monomer a) has been neutralized to an extent of 25 to 85 mol %.

10. The process according to claim 1, wherein the water-absorbing polymer particles have a centrifuge retention capacity of at least 15 g/g.

* * * * *